United States Patent [19]
Drake

[11] Patent Number: 5,911,389
[45] Date of Patent: Jun. 15, 1999

[54] WAVE BASED SATELLITE CONSTELLATION

[75] Inventor: John H. Drake, Santa Clara, Calif.

[73] Assignee: Lockheed Martin Corp., Sunnyvale, Calif.

[21] Appl. No.: 08/770,480

[22] Filed: Dec. 20, 1996

[51] Int. Cl.$^6$ ................................................ B64G 01/10
[52] U.S. Cl. ................................... 244/158 R; 455/12.1; 701/226; 342/356
[58] Field of Search ......................... 244/158 R; 392/355, 392/356, 365; 701/13, 226, 215; 455/12.1, 13.2

[56] References Cited

U.S. PATENT DOCUMENTS

| | | | |
|---|---|---|---|
| 3,243,706 | 3/1966 | Grisham | 244/158 R |
| 3,340,531 | 9/1967 | Kefalas et al. | 244/158 R |
| 4,502,051 | 2/1985 | Dondl | 343/356 |
| 5,551,924 | 9/1996 | Horstein et al. | 244/158 R |
| 5,641,134 | 6/1997 | Vatt | 244/158 R |
| 5,669,585 | 9/1997 | Castiel et al. | 244/158 R |
| 5,678,175 | 10/1997 | Stuart et al. | 455/13.1 |
| 5,738,309 | 4/1998 | Fowell | 342/355 |
| 5,788,187 | 8/1998 | Castiel et al. | 244/158 R |

OTHER PUBLICATIONS

Walker, J. G., "Comments on Rosette Constellations of Earth Satellites", IEEE Transactions on Aerospace and Electronic Systems, vol. AES–18, No. 4, pp. 723–724, Nov. 1982, U.S.A.

Walker, J.G., "Continuous Whole–Earth Coverage By Circular–Orbit Satellite Patterns", Royal Aircraft Establishment, Technical Report 77044, Mar. 24, 1977, United Kingdom.

Walker, J. G., "Coverage Predictions and Selection Criteria For Satellite Constellations", Royal Aircraft Establishment, Technical Report 82116, Dec. 2, 1982, United Kingdom.

Walker, J. G., "Satellite Patterns for Continuous Multiple Whole–Earth Coverage", IEEE International Conference on Maritime and Aeronautical Satellite Communication and Navigation, pp. 119–1122, Mar. 7–9, 1978, United Kingdom.

Walker, J. G., "Circular Orbit Patterns Providing Continuous Whole Earth Coverage", Royal Aircraft Establishment, Technical Report 70211, Nov. 1970, United Kingdom.

*Primary Examiner*—Virna Lissi Mojica
*Attorney, Agent, or Firm*—Feix & Feix

[57] ABSTRACT

A constellation (100) comprising a plurality of man-made satellites (1–27). The satellites (1–27) orbit a celestial body (110) along a plurality of orbits (120–128), which are located at a substantially common altitude and have a substantially common inclination. The satellites (1–27) are positioned in a predetermined order substantially along a wave (130). Each satellite (1–27) maintains its position in the predetermined order along the wave (130) while orbiting the celestial body (110). A system in accordance with the invention may further include a ground station adapted for enabling communication with at least one of the satellites (1–27). The satellites (1–27) may be positioned based on a Walker code T/P/F, where T is the total number of satellites (1–27) in a full Walker rosette corresponding to the Walker code, P is the number of distinct orbits (120–128), and F/T is the phase shift between adjacent orbits (120–128). The Walker code T/P/F may be determined by the equation F=(T−c+nP)N/(c−1) where c is the number of cycles in the wave 130, N is the number of satellites (1–27) in each orbit (120–128), N is the greatest common factor of T and (c−1), and n is an integer chosen such that O≦F<P. At least one of the satellites (1–27) may also be adapted to maintain a permanent communications link with a second satellite (1–27) which is positioned adjacent to it in the predetermined order along the wave (130).

50 Claims, 11 Drawing Sheets

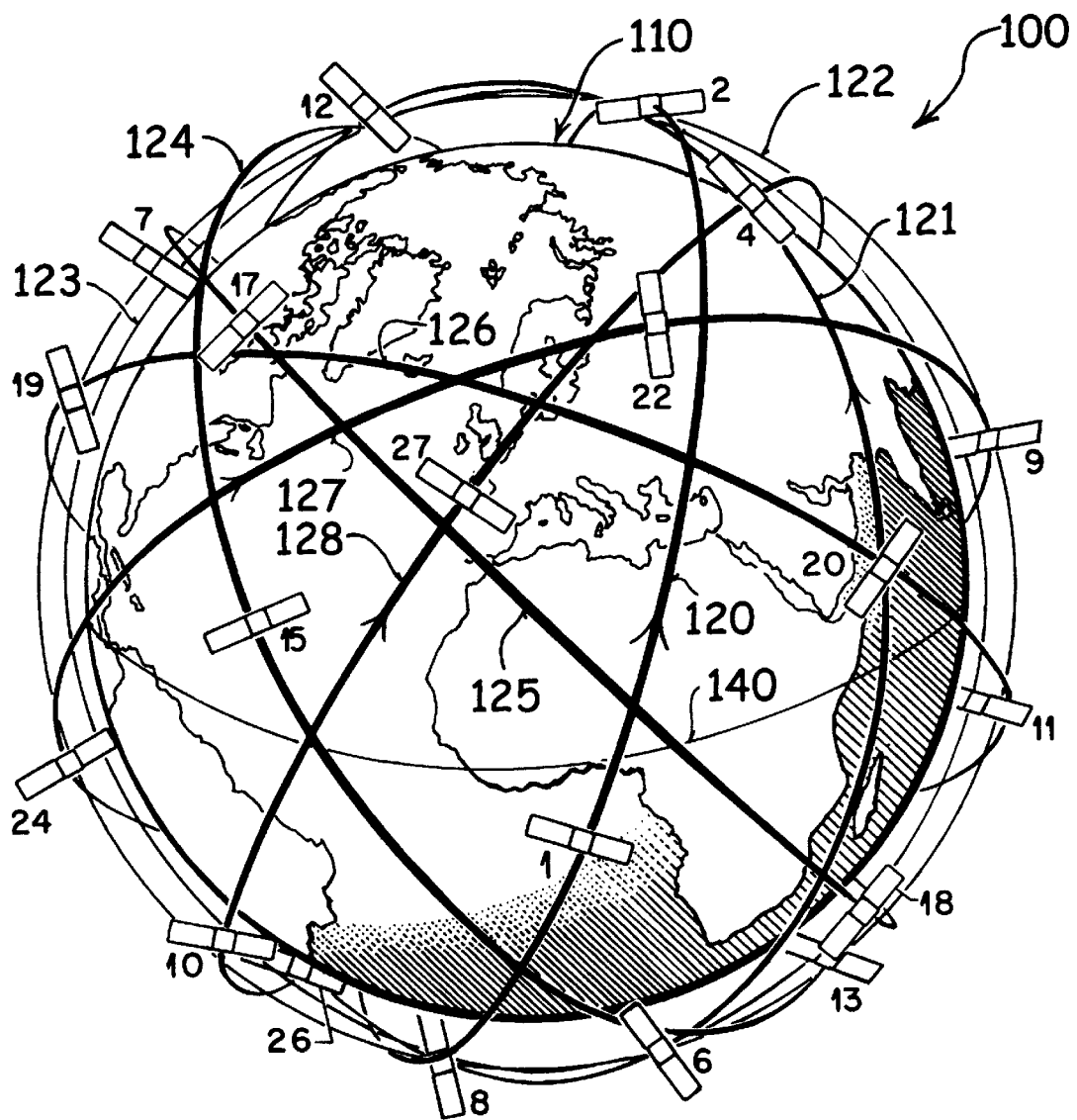
FIG_1

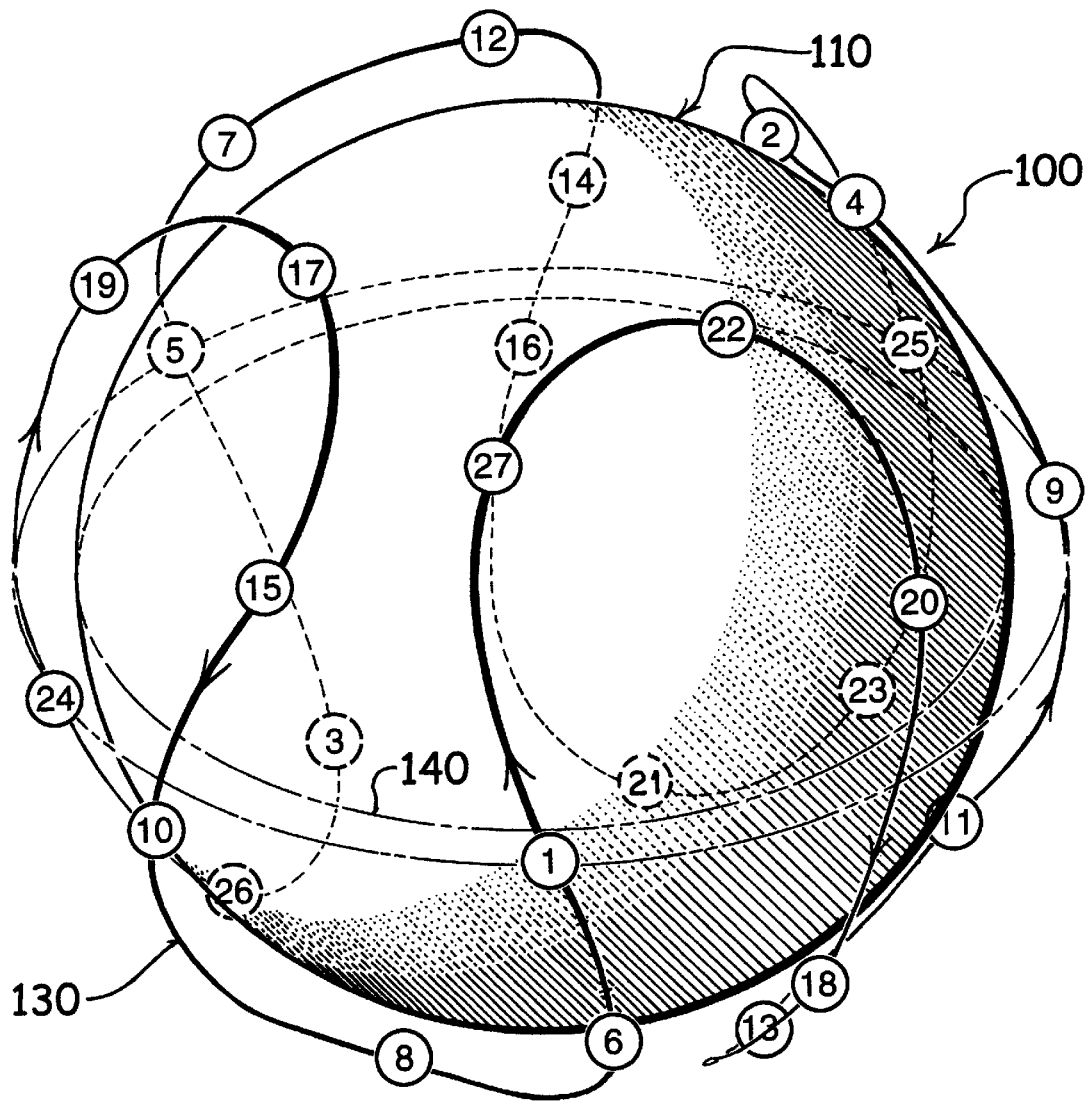
FIG_2

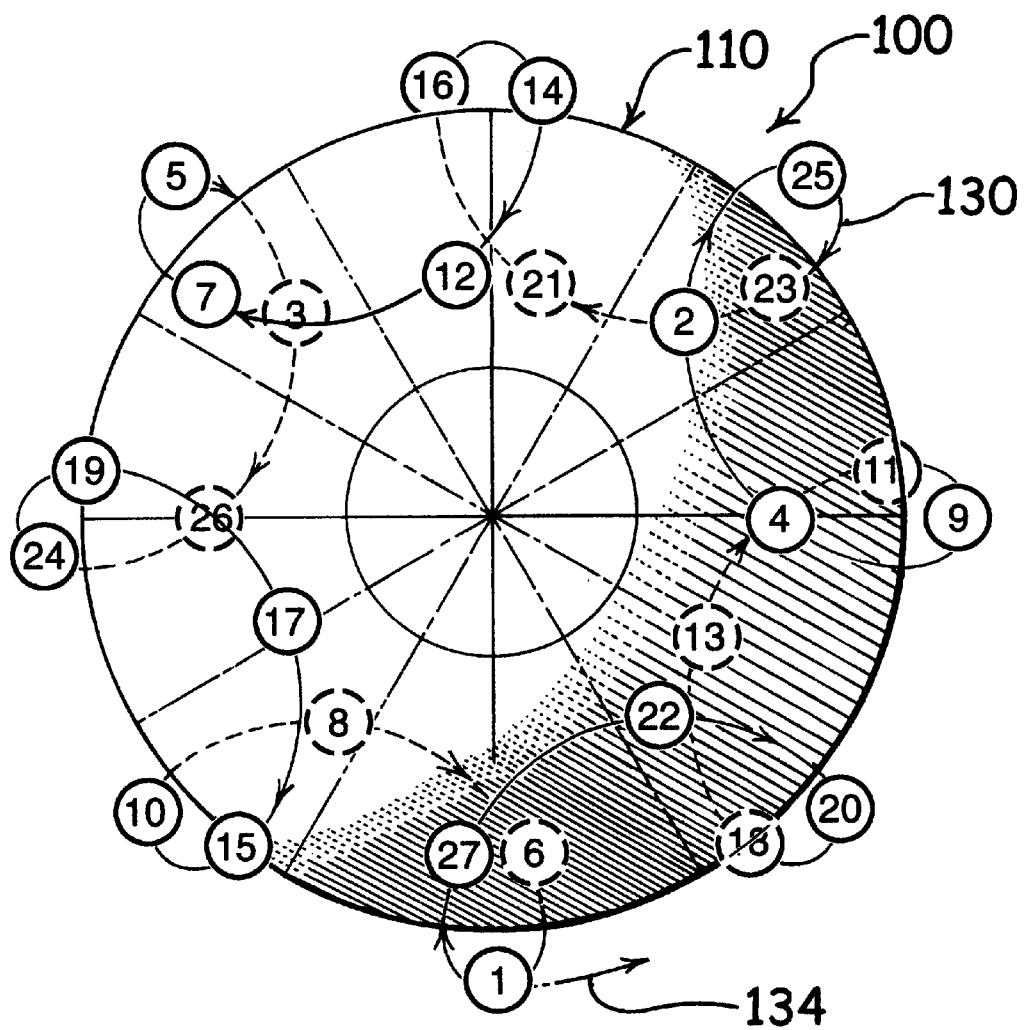

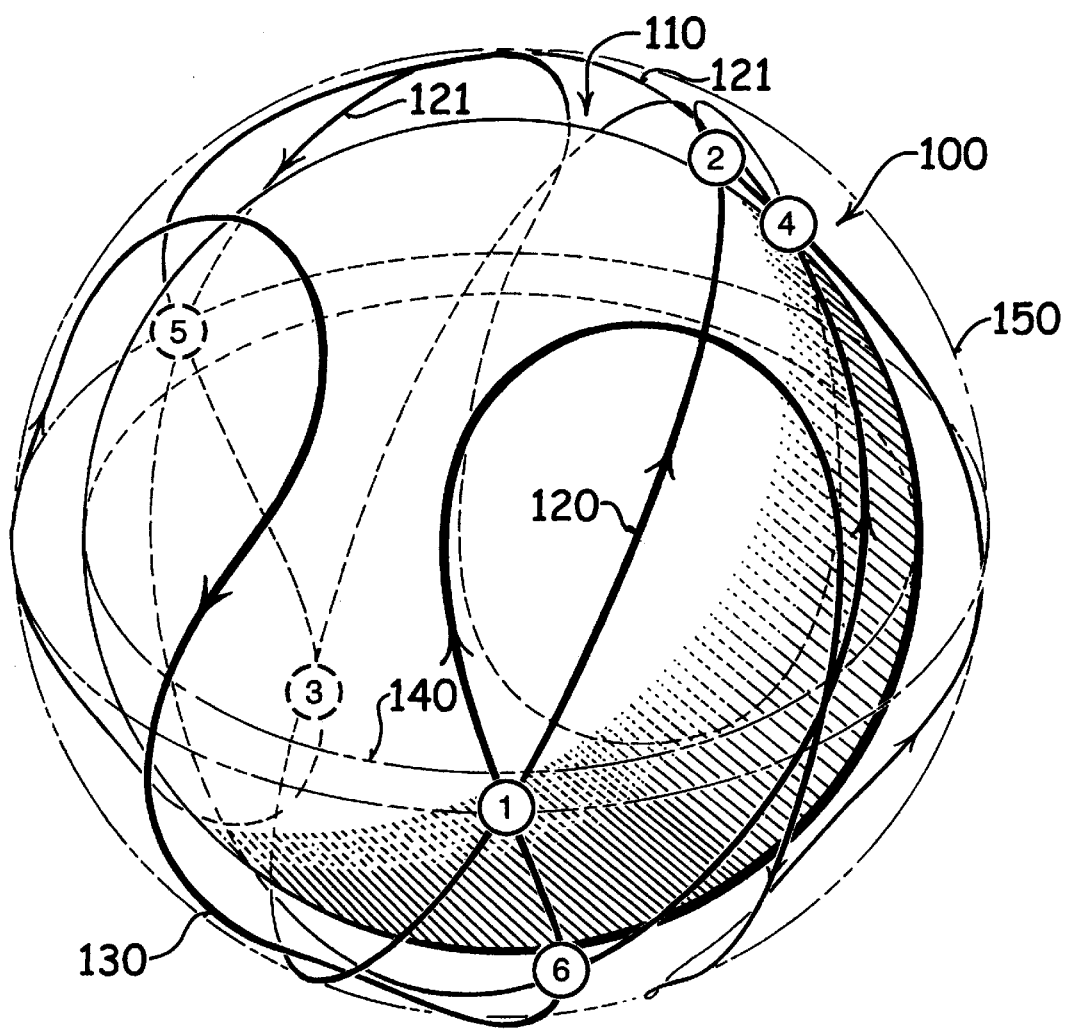
FIG_4

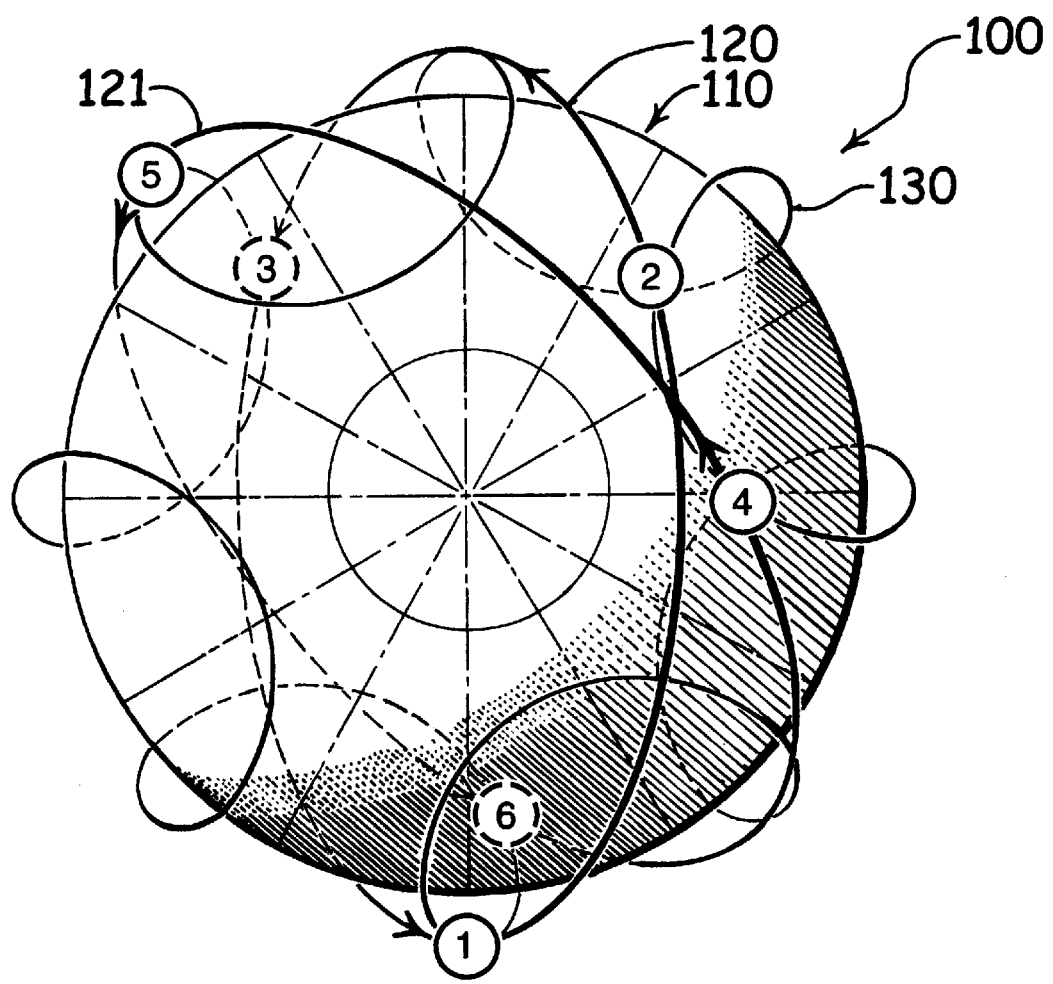
FIG_5

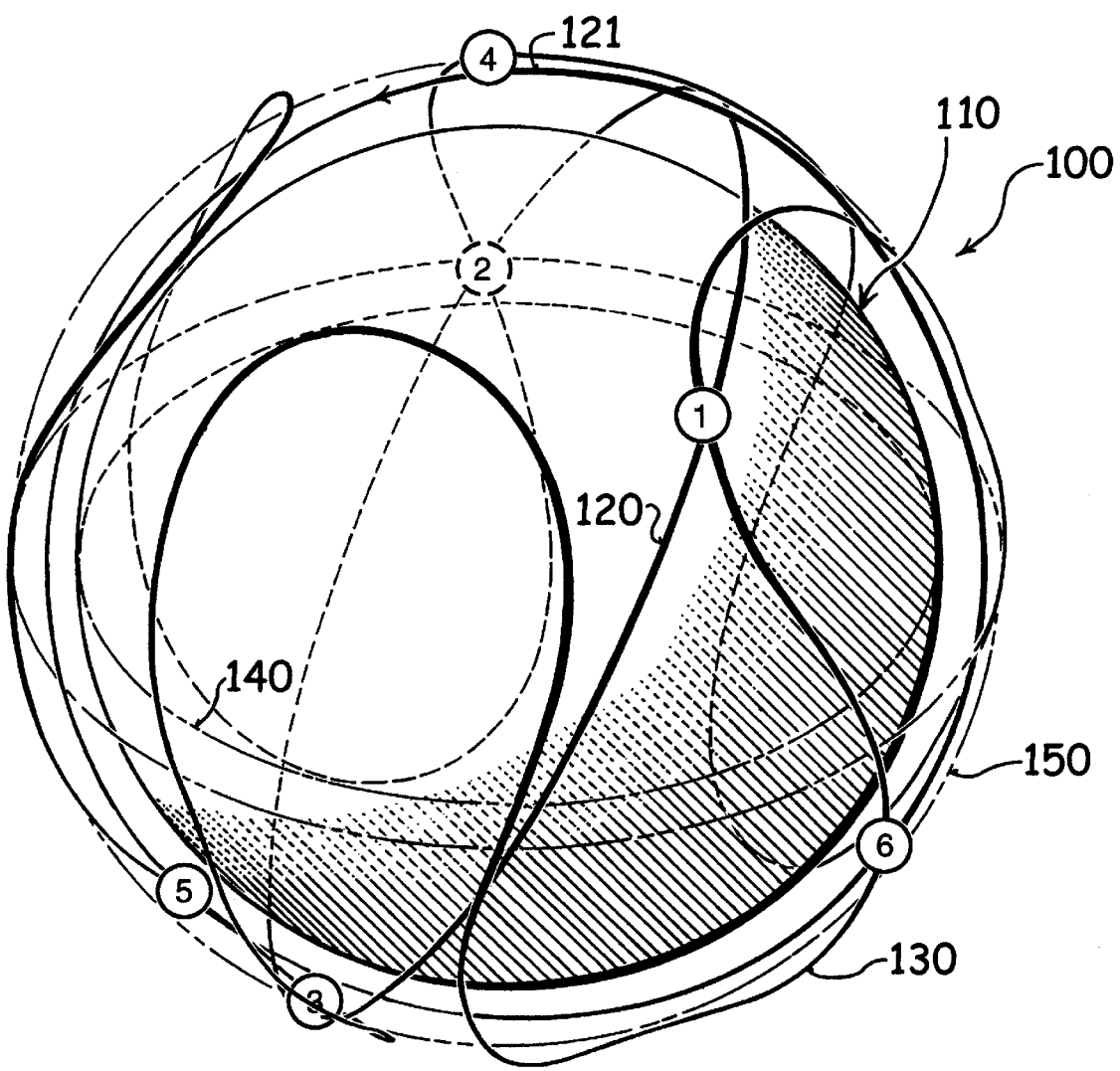

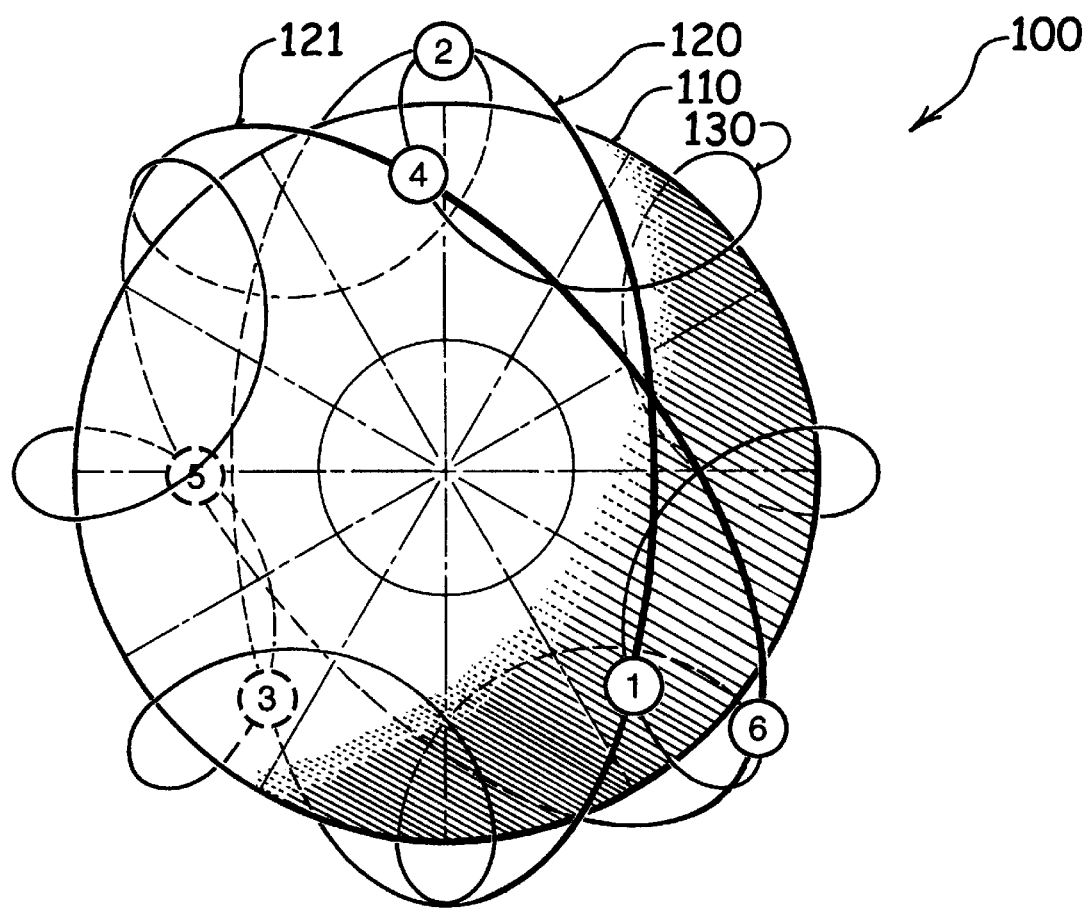
FIG_7

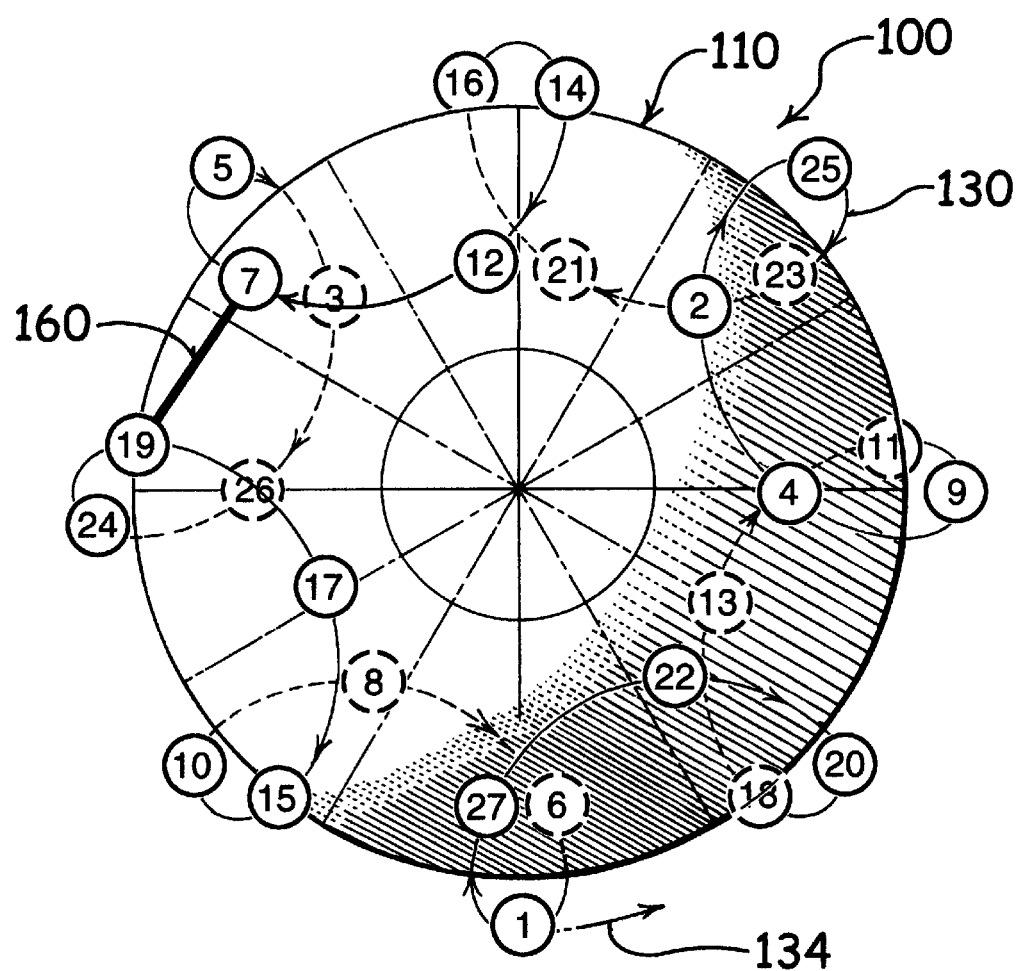
FIG_8

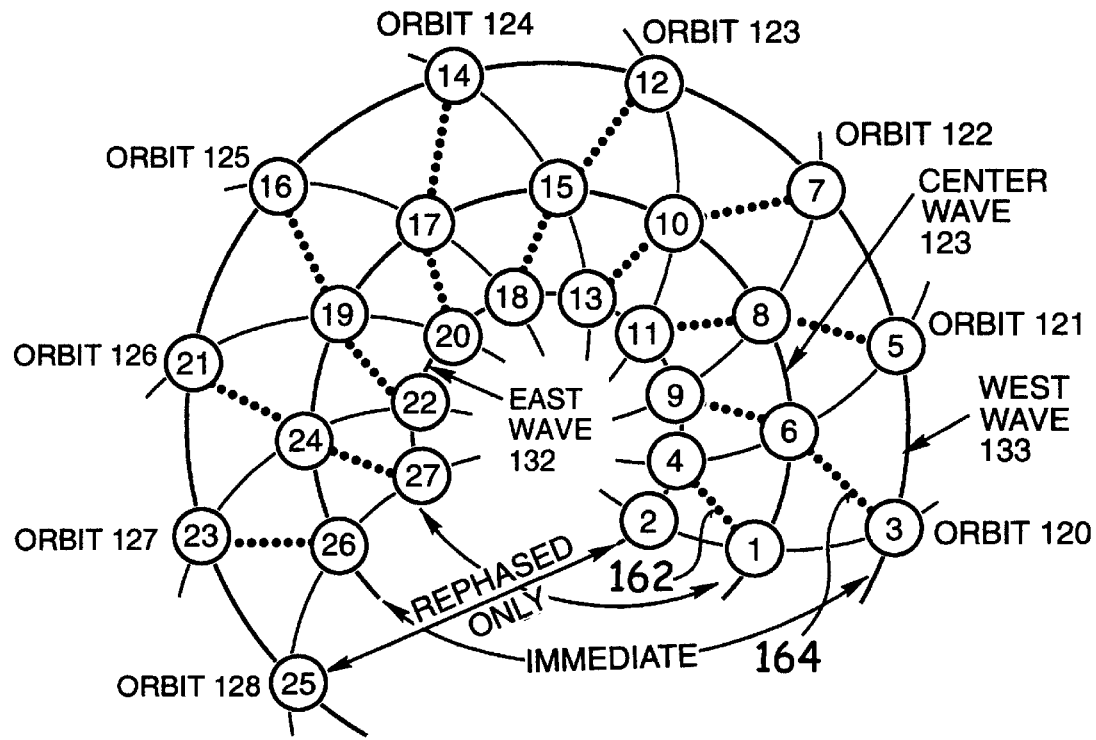
FIG_9
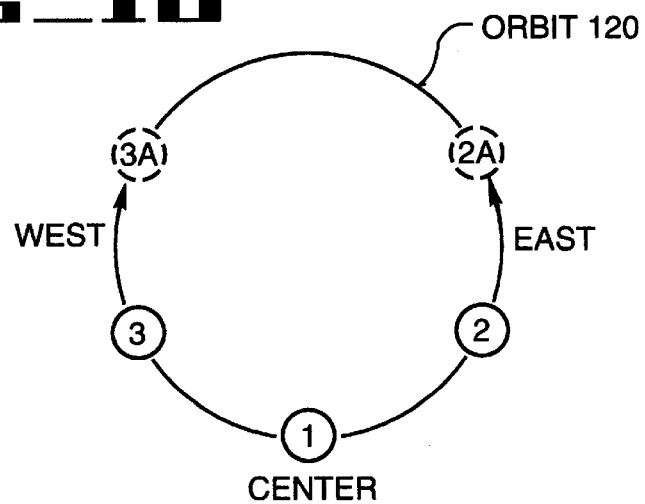
FIG_10

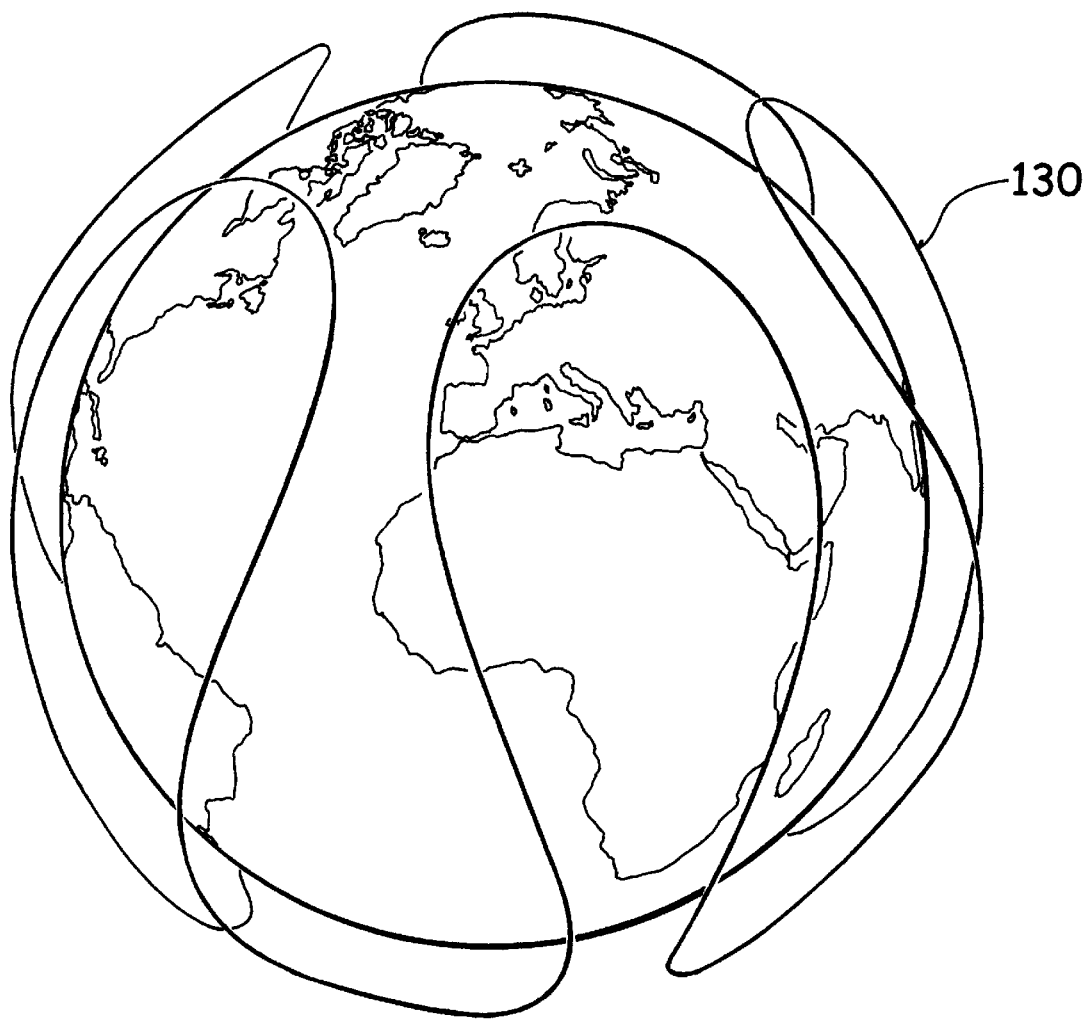
FIG_11

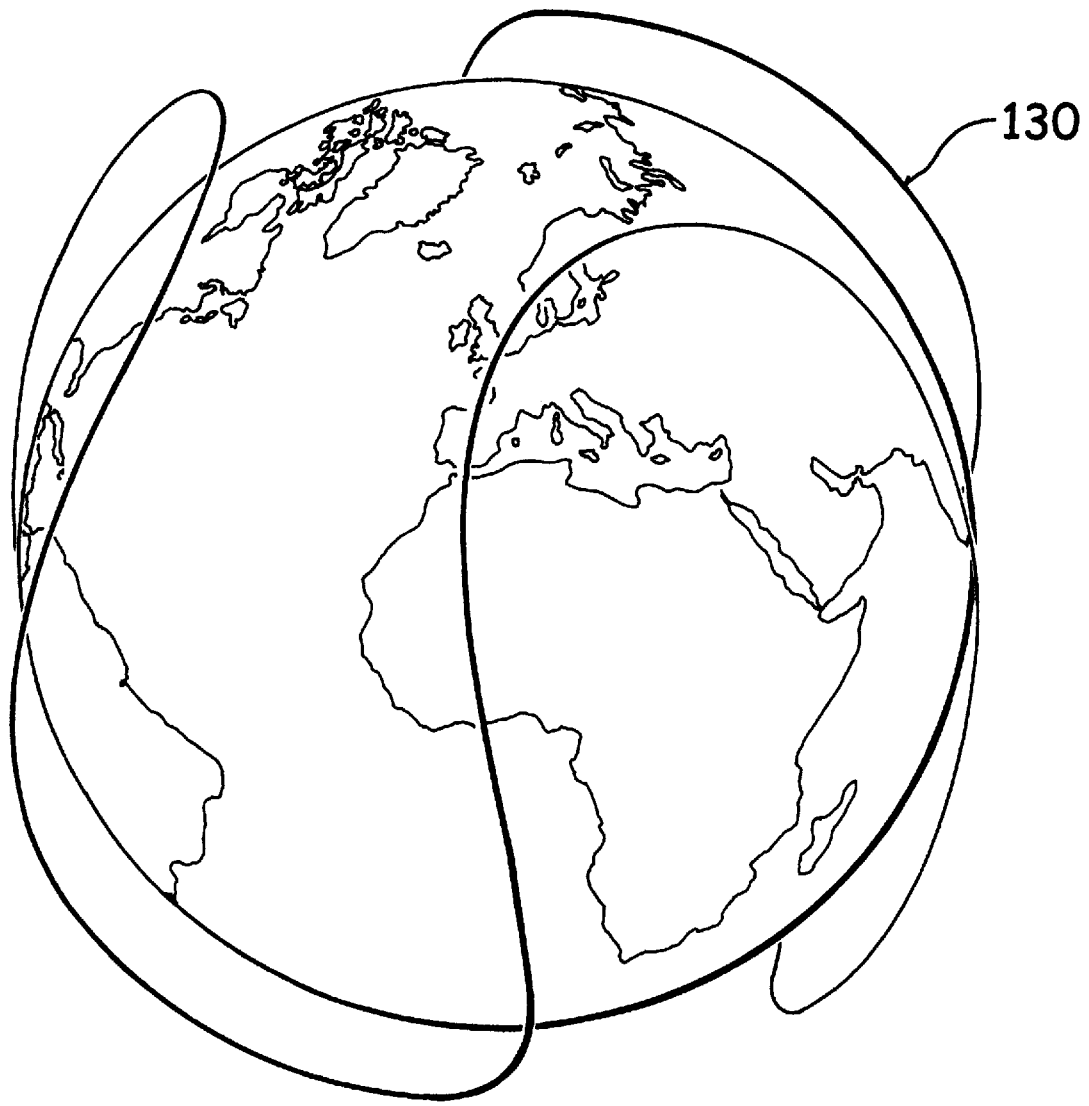
FIG_12

WAVE BASED SATELLITE CONSTELLATION

TECHNICAL FIELD

This invention pertains to the field of satellite constellations and more particularly to cross linking architectures for satellite constellations.

BACKGROUND ART

As a result of advances in satellite technology and the growing number of applications which utilize satellites, satellite constellations are becoming increasingly important. For example, satellite constellations may be used to provide global coverage or near global coverage for communications, environmental monitoring, weather forecasting, or surveillance purposes. In addition, advances in satellite technology, launch vehicles and facilities, sensor technologies, on-board microprocessors, and satellite communications have made satellite constellations more commercially feasible.

The increasing demand for satellite constellations, in turn, has resulted in greater emphasis on direct communications, or cross linking, between satellites within a constellation. For example, cross linking may be used to efficiently coordinate satellites within a constellation. Two or more satellites might communicate with each other in order to coordinate their tracking of a common location, thus resulting in stereo tracking of that location.

Cross linking may also be used to maintain a communications network among the satellites of the constellation. For example, if the purpose of the constellation is to provide a global communications network similar in architecture to the land-based cellular telephone network, then cross linking may be used to pass messages across the satellite constellation. As another example, satellites in a constellation may acquire raw data which is to be processed via on-board processors before down-linking to a ground station, thus reducing the amount of data to be down-linked. The desired processing, however, may require data from several satellites. Cross linking may be used to centralize the raw data in a single satellite, thus facilitating on-board processing. If the single satellite also handles communications between the constellation and the ground station, then the total number of ground stations and/or the sophistication of the ground station may be reduced.

The demand for satellite constellations has also resulted in increased interest in low earth orbits. For example, the altitude of geosynchronous orbit may be excessive for communications or sensor range to the ground. However, as satellite altitudes are reduced, it becomes more difficult to communicate between satellites because a large part of the view of each satellite is blocked by the earth. Inter-satellite cross linking also becomes more complex while the need becomes greater since ground link relays become more impractical.

Conventional satellite constellations utilize plane-based cross link architectures. In this architecture, the constellation contains a number of orbits, each of which lies in a distinct plane. Each orbit contains enough satellites to allow communication among all the satellites in the orbit without earth blockage. Communication between satellites in two different orbits is centered about the intersection of the two orbits. As satellites from the two orbits approach the intersection point, they become close enough to allow cross linking between the two satellites and hence the two orbits. The cross link allows communications between the two satellites for as long as the cross link is operational. Since each of the two satellites can communicate with any of the other satellites in its orbit, the cross link essentially allows communications between the two orbits. However, as the two cross linked satellites travel along their orbits, they will begin to travel away from the intersection point and each other and, at some point, the cross link between the two satellites can no longer be maintained. However, the cross link will be replaced by a new cross link between two other satellites approaching the intersection point. In this way, any two orbits and hence the entire satellite constellation may be permanently networked together. The making and/or breaking of cross links is referred to as switching.

The plane-based cross link architecture, however, has several disadvantages. First, switching, which is not an insignificant task and may require additional equipment on the satellites, is required to maintain the communications network. In addition, since the network is always being reconfigured, routing of messages is dynamic and must be continuously updated. These problems can affect the reliability of the network and multiply as the number of orbits increases. Another disadvantage of plane-based cross link architectures is that at low altitudes, the communications range of any one satellite is significantly limited by the earth's curvature. As a result, in order to maintain communications among all the satellites in a specific orbit, as is required by the plane-based cross link architecture, each orbit must contain a large number of satellites. The resulting plane-based constellation requires many satellites.

Thus, there is a need for satellite constellations which support cross linking architectures based on reduced or no switching. There is also a need for satellite constellations which utilize fewer numbers of satellites at low altitudes.

DISCLOSURE OF INVENTION

The present invention describes a constellation (100) comprising a plurality of man-made satellites (1–27). The satellites (1–27) orbit a celestial body (110) along a plurality of orbits (120–128). The orbits (120–128) are located at a substantially common altitude and have a substantially common inclination. The common inclination is measured with respect to a reference circle (140) about the celestial body (110). Each satellite (1–27) orbits the celestial body (110) along one of the orbits (120–128). The satellites (1–27) are also positioned in a predetermined order substantially along a wave (130). Each satellite (1–27) maintains its position in the predetermined order along the wave (130) while orbiting the celestial body (110).

BRIEF DESCRIPTION OF THE DRAWINGS

These and other more detailed and specific objects and features of the present invention are more fully disclosed in the following specification, reference being had to the accompanying drawings, in which:

FIG. 1 is a perspective view of a constellation 100 of satellites 1–27 in orbits 120–128 about a celestial body 110;

FIG. 2 is a perspective view of the constellation 100 of FIG. 1 showing the satellites 1–27 positioned along a wave 130;

FIG. 3 is a polar view of the constellation 100 of FIG. 2;

FIG. 4 is a perspective view of satellites 1–6 of FIG. 1 showing the satellites 1–6 simultaneously in orbits 120–121 and positioned along the wave 130;

FIG. 5 is a polar view of the satellites 1–6 of FIG. 4;

FIG. 6 is a perspective view of satellites 1–6 of FIG. 4 after the satellites 1–6 have traveled approximately 60 degrees along each of their orbits 120–121;

FIG. 7 is a polar view of the satellites 1–6 of FIG. 6;

FIG. 8 is a polar view of the constellation 100 of FIG. 3 showing a temporary communications link 160 between two satellites;

FIG. 9 is a diagram of a communications network maintained during deployment of the constellation 100 of FIG. 1;

FIG. 10 is a view illustrating the rephasing of satellites 1–3 of FIG. 9;

FIG. 11 is a perspective view of a wave 130 with five cycles; and

FIG. 12 is a perspective view of a wave 130 with three cycles.

DETAILED DESCRIPTION OF THE PREFERRED EMBODIMENTS

FIG. 1 illustrates a preferred embodiment of a satellite constellation 100 in accordance with the invention. The constellation 100 includes twenty-seven satellites 1–27 which orbit the earth 110 along nine orbits 120–128 in the directions indicated by the arrows placed on some of the orbits. Satellites 3, 5, 14, 16, 21, 23, and 25 are not shown in FIG. 1 since they are obscured by the earth 110. Each of the orbits 120–128 contains three of the satellites 1–27. More specifically, satellites 1, 2 and 3 travel along orbit 120; satellites 4, 5 and 6 along orbit 121; and so forth.

All of the orbits 120–128 are circular in shape, located at an altitude of 1200 kilometers, and have an inclination of 60°. However, each of the orbits 120–128 crosses the equatorial plane at a different ascending nodal crossing point. The ascending nodal crossing points of the orbits 120–128 are uniformly spaced about the equator 140 and follow the numerical sequence of the orbits 120–128. That is, the ascending nodal crossing points are separated in longitude by 40°; and, furthermore, if one were to travel east around the equator 140, one would encounter the ascending nodal crossing points of the orbits 120–128 in numerical order: 120, then 121, then 122, etc. As used herein, the term "uniformly spaced" means that the angular spacing between ascending nodal crossing points is constant and the crossing points span the entire equator.

The three satellites in each orbit 120–128 are uniformly spaced about the orbit. That is, the angular separation of the three satellites in any orbit 120–128 is 120°. For the general case of N satellites per orbit, uniform spacing would result in an angular separation of 360°/N between satellites. All twenty-seven satellites 1–27 orbit the earth 110 at the same constant rotational velocity. In addition, the three satellites in any one orbit 120–128 are advanced by b ⁵⁄₂₇ths of a revolution with respect to the three satellites in the adjacent orbit to the west. For example, the satellites 4–6 in orbit 121 are ⁵⁄₂₇ths of a revolution ahead in their orbit compared to the satellites 1–3 in orbit 120.

The constellation 100 achieves full satellite coverage of the earth 110. For comparison, a constellation with comparable coverage but using a plane-based cross link architecture uses five orbits and seven satellites per orbit for a total of thirty-five satellites. The constellation 100 in accordance with the invention obtains comparable earth coverage using only twenty-seven satellites, resulting in a significant cost savings, among other advantages.

FIG. 2 is a view of the same constellation 100 as in FIG. 1, but more clearly illustrating some of the features of the invention. In FIG. 2, the satellites 1–27, are represented by the circled numerals 1–27, with the dashed circles showing obscured satellites 3, 5, 14, 16, 21, 23, 25, and 26. The circular orbits 120–128 have been eliminated for clarity. Instead, FIG. 2 shows a wave 130, along which the twenty-seven satellites 1–27 are positioned. The satellites 1–27 are approximately uniformly spaced along the wave 130. The wave 130 is analogous in form to the seam of an ordinary baseball, except that the wave 130 has four complete north to south cycles while a baseball seam contains only two cycles. FIG. 3 is a polar view of the constellation 100 and wave 130 shown in FIG. 2.

The satellites 1–27 are positioned along the wave 130 in a predetermined order. In this example, satellite 1 is adjacent to satellite 27, which is adjacent to satellite 22, which is adjacent to satellite 20, etc.

If the satellites 1–27 were frozen in these positions and assuming adjacent satellites were close enough to maintain a communications link, then a permanent communications network for the constellation 100 could be formed by having each satellite maintain a permanent communications link with the satellites positioned adjacent to it along the wave 130. These communications links typically use RF or laser technologies. For example, satellite 1 could communicate with satellites 27 and 6. Similarly, satellite 27 would communicate with satellites 1 and 22. Following this procedure, a communications network could be established for the constellation 100, allowing any of the satellites 1–27 to communicate with any other satellite 1–27. In addition, such a communications network would allow the entire constellation 100 to communicate with a single ground station through a single satellite. For example, if a ground station were linked to satellite 1, the other satellites 2–27 could communicate to the ground station by relaying data through the network to satellite 1.

The satellites 1–27, however, are not frozen in the positions shown in FIGS. 2 and 3. Instead, they orbit the earth 110 along their respective circular orbits 120–128. However, as the satellites 1–27 orbit the earth 110, the wave 130 also rotates about the earth 110 and each of the satellites 1–27 travels along the rotating wave 130 in the direction indicated by the arrows. More specifically, in this embodiment, the four-cycle wave 130 rotates eastward about the North pole - South pole axis as indicated by the arrow 134 in FIG. 3. The wave 130 rotates at three-fourths the rotational velocity of the satellites 1–27 in their respective orbits 120–128. The resulting relative motion of the satellites 1–27 with respect to the wave 130 is that the satellites 1–27 walk to the east along the rotating wave 130 as shown by the arrows along the wave 130.

As the satellites 1–27 walk along the wave 130, they remain positioned along the wave 130 and the order of the satellites 127 along the wave is maintained. For example, satellite 27 will always be adjacent to satellites 1 and 6. Since the predetermined order of the satellites 1–27 along the wave 130 is preserved as the satellites 1–27 orbit the earth 110, a permanent communications network based upon each satellite maintaining a permanent communications link with the satellite positioned adjacent to it along the wave 130 may be maintained. In this communications network, each satellite 1–27 communicates with the same two satellites. Hence, no switching of cross links is required, which is an advantage over conventional plane-base cross link architectures.

FIGS. 4–7 more clearly illustrate the interaction between the satellites 1–27, their orbits 120–128, and the wave 130. FIG. 4 is a view showing, for clarity, only satellites 1–6, their respective circular orbits 120 and 121, and their positions along the wave 130. FIG. 5 is a polar view of FIG. 4.

FIGS. 6 and 7 show perspective and polar views, respectively, of the same satellites 1–6, orbits 120–121, and wave 130, but after the satellites 1–6 have traveled 60° in their respective orbits 120 and 121 and the wave 130 has simultaneously rotated 45°. After the rotation, all of the satellites 1–6 are still positioned along the wave 130 and in the same order as before the rotation. For example, satellites 1 and 6 are adjacent to each other, satellites 2 and 4 are adjacent, and satellites 3 and 5 are adjacent.

First consider a single satellite 1 and the shape of the wave 130. Satellite 1 travels along a circular orbit 120 at a constant rotational velocity. Now assume that a reference sphere 150 rotates eastward about the earth 110's North pole—South pole axis at a constant rotational velocity which is (c−1)/c times the rotational velocity of the satellite 1. The path which the satellite 1 traces out on the rotating reference sphere 150 defines the shape of a wave 130 with c cycles. In general, the term "wave" will refer to any such path with at least two cycles. In the present example, c=4, so the wave 130 contains four cycles, and the reference sphere 150 and wave 130 both rotate at three-fourths the rotational velocity of the satellite 1.

Now consider satellites 2–5. Since each of these satellites 2–5 travels at the same constant rotational velocity as satellite 1 and also travels along a circular orbit 120 or 121 which is at the same altitude and same inclination as the circular orbit 120 for satellite 1, each of the satellites 2–5 will also trace out a wave 130 which is the same shape as and rotates at the same velocity as the wave 130 traced out by satellite 1. If all the satellites 1–6 are initially positioned along the same wave 130, then the waves traced out by each of the satellites 1–6 will be identically the same. That is, the waves associated with each of the individual satellites 1–6 will be coherent. As a result, the satellites 1–6 will initially be positioned along a single wave 130, as shown in FIGS. 4–5. As each satellite 1–6 orbits the earth 110, the satellites 1–6 as a group will remain positioned on a single wave 130 and will maintain their order along the wave 130, as shown in FIGS. 6–7. A similar analysis applies to the remainder of the satellites 7–27.

FIG. 8 illustrates a communications network, in accordance with the invention, which may be maintained by the constellation 100. Since the satellites 1–27 remain in the same order along the wave 130, a permanent communications network for the constellation 100 may be maintained by having each satellite communicate with its neighbor satellite 1–27. Thus, for example, if satellite 12 wanted to communicate with satellite 17, the message could be relayed from satellite 12 to 7 to 5 to 3 to 26 to 24 to 19 to satellite 17. One advantage of this communications network is that each satellite communicates with the same two other satellites. Hence, the network does not require continuous reconfiguring or switching of cross links. The plane-based cross link architecture, in contrast, requires constant reconfiguring and switching in order to achieve full network coverage. Another advantage of the communications network in FIG. 8 is that the ring topology offers two possible paths to connect any two satellites 1–27.

If switching is acceptable, alternate embodiments are possible. For example, a bypass link 160 may be established between satellites 7 and 19. Then, if satellite 12 wished to communicate with satellite 17, the message could be relayed from 12 to 7 to 19 via the bypass link 160 and then from 19 to 17. The bypass link 160 between satellites 7 and 19 will not be a permanent link, however, since the satellites 7 and 19 will separate as they travel along the wave 130. However, permanent communications between adjacent portions of the wave 130 may be established based on a series of temporary bypass links 160. For example, as the satellites 7 and 19 separate and the link 160 is broken, the link 160 may be replaced by a link between satellites 12 and 24 which will be approaching each other. If the communications link between satellites 12 and 24 is made before the link between 7 and 19 is broken, then a permanent communications link between two portions of the wave 130 will be established. In this example, the two portions are two adjacent cycles of the wave 130.

FIGS. 1–8 have been used to illustrate the maintenance of a communications network for a constellation 100 after the entire constellation 100 of twenty-seven satellites 1–27 has been deployed. It is also desirable to maintain a communications network for the partial constellation formed before the deployment of the satellites 1–27 is completed. FIGS. 9 and 10 will be used to illustrate such a communications network in accordance with the invention, based on the twenty-seven satellite example of FIGS. 1–8 but assuming an altitude of 1000 km rather than the 1200 km altitude previously assumed. For the following example, assume for practical reasons that the constellation 100 is deployed by launching three satellites at a time in a single launch vehicle into one of the orbits 120–128.

FIG. 9 is a schematic diagram illustrating how a communications network may be maintained as the twenty-seven satellites 1–27 are being deployed. The satellites 1–27 are represented by the circled numerals 1–27.

The deployment process begins by launching satellites 1–3 into orbit 120. In the final deployment of the full constellation 100, the satellites 1–3 will be uniformly spaced about the orbit 120. However, at an altitude of 1000 kilometers, a 120° spacing between the satellites 1–3 would not allow the satellites 1–3 to communicate with each other. Therefore, in the initial deployment of satellites 1–3, they are more closely spaced to allow communications. In this example, the satellites 1–3 may be evenly spaced about the orbit 120 in angular increments of approximately 60°. The term "evenly spaced" means that the angular spacing between adjacent satellites is constant but the satellites may not span the entire orbit. In contrast, the term "uniformly spaced" means that the angular spacing between satellites is constant and that the satellites span an entire orbit. With this reduced angular spacing, the satellites 1–3 may communicate with each other. However, the satellites 1–3 will not be located on a single wave. Instead, each satellite 1–3 will be located on its own wave 131–133, as indicated in FIG. 9. Satellite 1 will be positioned on center wave 131; satellite 2 on east wave 132; and satellite 3 on west wave 133. The waves 131–133 will be of the same shape and rotate in the same direction at the same speed, but the waves 131–133 will be out of phase with each other in their rotation. In other words, the waves 131–133 are not coherent.

Satellites 4–6 are then deployed in the second launch into orbit 121. The satellites 4–6 have the same angular spacing in their orbit 121 as the satellites 1–3 have in their orbit 120. In addition, each of the satellites 4–6 is positioned along one of the waves 131–133 with respect to the corresponding satellite 1–3. For example, in the final deployment, satellites 1 and 6 are adjacent on the wave 130. Therefore, at this stage of the deployment, satellite 6 is positioned in the same relative position to satellite 1 along the center wave 131. More specifically, satellite 6 is $4/27$ths of a revolution retarded in its orbit 121 with respect to satellite 1's position in orbit 120. Similarly, satellite 4 is positioned on east wave 132 with respect to satellite 2, and satellite 5 is positioned on west wave 133 with respect to satellite 3.

In this configuration, the satellites 1–6 which travel along the same orbit 120–121 can communicate with each other since they are closely spaced. That is, satellites 1–3 can communicate with each other and satellites 4–6 can communicate with each other. In addition, the satellites 1–6 which are positioned along the same wave 131–133 can also communicate with each other. That is, satellites 1 and 6 can communicate, satellites 2 and 4 can communicate, and satellites 3 and 5 can communicate. Thus, a communications network for the partial constellation of satellites 1–6 can be formed.

The satellites within each orbit 120–121 may be spaced further apart, for example to achieve greater coverage of the earth. In this example, the spacing between satellites 1–3 and satellites 4–6 may be increased from approximately 60° to approximately 80°. After this rephasing, the satellites 1–6 within a single orbit 120–121 will no longer be able to communicate with each other. However, satellites which are positioned along the same wave 131–133 can still maintain communications since the relative positions of the satellites 1–6 on waves 131–133 are unaffected by the rephasing. Hence, a communications network for the partial constellation may be formed if communications links between the waves 131–133 are available. In this example, after rephasing, satellite 1 may communicate with satellite 4 and satellite 3 may communicate with satellite 6, as indicated by the dotted links 162 and 164. Thus, a communications network for the partial constellation of satellites 1–6 may be maintained. The communications network runs from satellite 2 to 4 to 1 to 6 to 3 to 5 in a shoelace type pattern, as shown in FIG. 9.

The same principles may be followed as the satellites 7–27 in each of the other orbits 122–128 are deployed. At any point of the deployment, all the satellites 1–27 which are positioned along a single wave 131–133 will be able to communicate with each other. Communications between waves 131–133 may be established by using the shoelace approach described previously.

When the final three satellites 25–27 are deployed in orbit 128, three waves 131–133 of nine satellites each will be formed. The three waves 131–133, however, will not be coherent with each other and will be rephased with respect to each other in order to complete the deployment. When the final three satellites 25–27 are deployed, satellite 27 will be able to communicate immediately with satellite 1, and satellite 26 will be able to communicate with satellite 3. However, satellite 25 will not be able to communicate with satellite 2 until the three waves 131–133 are made coherent.

FIG. 10 illustrates the rephasing process. At the beginning of the rephasing process, satellites 1, 2 and 3 which are located in orbit 120 are evenly spaced throughout the orbit 120 with a spacing of approximately 80°. In the final deployment, the satellites 1–3 will be uniformly spaced about the orbit 120 with a spacing of 120°. In the rephasing process, the satellites 2 and 3 are simply shifted from their 80° locations 2 and 3 to their final 120° locations 2A and 3A. This occurs for all orbits 120–128, resulting in the fully deployed constellation 100 discussed previously.

In this deployment scheme, the communications network for the partial constellation does not require any switching of cross links. If switching of cross links is acceptable, then rephasing of the satellites 1–27 can occur much earlier in the deployment. In this example, the rephasing process may occur when approximately one-half of the satellites 1–27 have been deployed.

The twenty-seven satellite example used in FIGS. 1–10 is a preferred embodiment of a satellite constellation 100 in accordance with the invention. However, it is not the only embodiment of the invention. Other embodiments and alternatives which utilize the principles described above will be obvious to those of ordinary skill in the art.

For example, the altitude of the orbits in the twenty-seven satellite embodiment was 1,200 kilometers. Compared to higher orbit altitudes, this and other low altitudes have the advantage of avoiding background radiation due to the earth's trapped radiation belts. Alternate embodiments, however, could utilize other altitudes, including higher altitudes. The advantage of lower total satellite count which the invention has over conventional plane-based cross link architectures will generally be more pronounced at lower altitudes.

As another example, the inclination of the orbits in the twenty-seven satellite embodiment was 60 degrees, which results in full satellite coverage of the earth. The invention, however, may be used with other inclinations and/or coverage which is less than full earth.

Furthermore, in the twenty-seven satellite embodiment, the inclination was measured with respect to the equator. That is, the inclination of an orbit was the angle between a plane which contained the orbit and the equatorial plane. As a result, the wave in this embodiment rotated eastward about the North pole-South pole axis. The invention is not restricted to these orientations. For example, alternative embodiments could be based on westward rotating waves. As another example, the entire constellation could be rotated 90 degrees about the center of the earth. Then, the equator would be replaced by a reference circle which ran through the North and South poles, and the North pole-South pole axis would be replaced by an axis which pierced the equator. In general, the equator could be replaced by any reference circle about the earth, with the North pole-South pole axis replaced by a corresponding reference axis which ran through the center of the reference circle and was perpendicular to the plane containing the reference circle. Inclination would then be measured with respect to the reference circle rather than the equator. Embodiments based on the equator orientation, however, have the advantage of more stable orbits since precession effects from the earth's bulge are more uniform. In addition, the constellation could be set up about any celestial body and is not restricted to the earth.

As another example, the twenty-seven satellite embodiment utilized orbits which were perfectly circular in shape and satellites which traveled along those orbits at a constant rotational velocity. Neither of these is required to practice the invention. For example, the satellites may orbit at a non-constant rotational velocity in elliptical orbits. If the accelerations and decelerations of the various satellites are coordinated, then the satellites will still maintain their relative positions along the wave although the wave may now be based on an ellipsoid rather than a sphere. Even if the velocity variations were not perfectly coordinated and satellites were not perfectly positioned along a wave, the constellation will still be in accordance with the invention if the satellites travel substantially along the wave. For example, the satellites may deviate from the wave but still achieve good coverage of the earth and/or be able to maintain a permanent communications network based on communications links to adjacent satellites. Elliptical orbits may be chosen in order to more efficiently utilize a satellite. For example, an elliptical orbit might result in a satellite spending more time over the Northern hemisphere than it would in a corresponding circular orbit.

As another example, the wave in the twenty-seven satellite embodiment had four cycles. Other numbers of cycles may be used. FIG. 11 shows a wave 130 with five cycles; while FIG. 12 shows a wave 130 with three cycles. In the twenty-seven satellite example, the four-cycle wave was optimum in that the resulting constellation contained the fewest number of satellites which could achieve full earth coverage at the orbit altitude of 1200 kilometers. Generally speaking, at least two cycles are required in order to obtain full earth coverage, and more cycles are required as altitude is reduced. At an altitude of less than 1,300 kilometers, there are no full earth coverage solutions with less than three cycles. On the other hand, for a given number of satellites, the distance between satellites will be reduced and cross link connectivity more strongly supported for waves of fewer cycles. As a result, waves which can achieve the desired earth coverage but which have a low number of cycles are generally preferred.

As another example, the twenty-seven satellite embodiment used the full complement of twenty-seven satellites. Alternate embodiments could use fewer than the full complement of satellites. For example, rather than using twenty-seven satellites positioned along the entire wave, thirteen satellites could have been positioned along one-half of the wave. Such an embodiment, however, would not have full coverage of the earth.

As another example, the twenty-seven satellite embodiment used a four-cycle wave with twenty-seven satellites distributed among nine orbits with three satellites per orbit. Each orbit was 5/27ths of a revolution advanced with respect to the adjacent orbit. Alternate embodiments may use waves of a different number of cycles, different numbers of satellites, and/or different numbers of orbits with different phasings between adjacent orbits.

Various embodiments may be described by a convention called a Walker code. A Walker code coupled with an altitude and an inclination defines a Walker rosette, which is a specific satellite constellation. The Walker rosette family of constellations generally describes satellite constellations based on the same assumptions as the twenty-seven satellite embodiment. That is, the constellation includes a number of orbits which are circular, located at a common altitude, and having a common inclination. The satellites of the constellation are assumed to be evenly distributed among the orbits, and uniformly spaced within each orbit. The ascending nodal crossing points of the orbits are assumed to be uniformly spaced about the equator. The satellites are assumed to travel along their orbits at a constant rotational velocity.

The Walker code T/P/F specifies the relative positions of satellites within the orbits. T is the total number of satellites in the constellation, P is the number of orbits, and F specifies the change in phase from one orbit to the next orbit to the east. More specifically, successive orbits to the east are advanced by F/T fraction of an orbit revolution in the plane of rotation. The number of satellites per orbit, N, is equal to T/P.

Various embodiments satisfy the equation $$F=(T-c+nP)N/(c-1) \quad (1)$$

where c is the number of cycles in the wave, and n is an integer such that the integer F satisfies $0 \leq F < P$. In addition, N is the greatest common factor of T and (c-1). The satellites in Walker rosettes which satisfy Eqn. 1 and the above conditions will be positioned along a single wave, as in the twenty-seven satellite embodiment. For any given T and c, there will be a unique solution.

In the twenty-seven satellite example, the wave has four cycles, so c=4 and (c-1)=3. The number of satellites T=27. The greatest common factor of T and (c-1) is 3, so the embodiment uses N=3 and P=9. That is, there are three satellites per orbit and nine total orbits. Eqn. 1 is then solved for F, yielding n=-2 and F=5. Therefore, the phase shift between adjacent orbits is 5/27ths of a revolution. The corresponding Walker code is 27/9/5. The constellation is the Walker rosette specified by the Walker code 27/9/5, the altitude of 1,200 kilometers, and the inclination angle of 60 degrees.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A constellation comprising a plurality of man-made satellites, wherein:

the plurality of satellites orbit a celestial body along a plurality of orbits located at a substantially common altitude and having a substantially common inclination, the common inclination measured with respect to a reference circle about the celestial body, each satellite orbiting the celestial body along one of the plurality of orbits;

each orbit has at least one certain satellite in the orbit which corresponds to at least one certain satellite in each of the other orbits;

the plurality of orbits are phased so that said certain satellites are positioned in a predetermined order substantially along at least one certain wave;

each of said certain satellites maintains its position in the predetermined order along the certain wave while orbiting the celestial body; and said certain wave rotates about the celestial body at a given fraction of the speed of rotation of the satellites in their orbits.

2. The constellation of claim 1 further comprising a ground station adapted for enabling communication with at least one of the plurality of satellites.

3. The constellation of claim 1 wherein the constellation includes at least eighteen satellites.

4. The constellation of claim 1 wherein the certain satellites are substantially uniformly spaced along the certain wave.

5. The constellation of claim 1 wherein:

the orbits are circular; and each of the satellites orbits the celestial body at substantially the same constant rotational velocity.

6. The constellation of claim 5 wherein:

the certain wave includes c cycles; and the certain wave rotates about a reference axis at a rotational velocity equal to (c-1)/c times the rotational velocity of the satellites, the reference axis containing a center of the reference circle and extending perpendicularly from a plane containing the reference circle.

7. The constellation of claim 1 wherein, for each orbit, the satellites orbiting along said orbit are evenly spaced about said orbit.

8. The constellation of claim 7 wherein, for each orbit, the satellites orbiting along said orbit are uniformly spaced about said orbit.

9. The constellation of claim 1 wherein:

each orbit is characterized by an ascending nodal crossing point of the reference circle; and the plurality of ascending nodal crossing points are evenly spaced about the reference circle.

10. The constellation of claim 9 wherein the plurality of ascending nodal crossing points are uniformly spaced about the reference circle.

11. The constellation of claim 1 wherein:
the celestial body is Earth; and
the reference circle lies in the equatorial plane.

12. A constellation comprising a plurality of man-made satellites wherein:
the plurality of satellites orbit a celestial body along a plurality of orbits located at a substantially common altitude and having a substantially common inclination, the common inclination measured with respect to a reference circle about the celestial body, each satellite orbiting the celestial body along one of the plurality of orbits;
the plurality of satellites are positioned in a predetermined order substantially along a wave;
each satellite maintains its position in the predetermined order along the wave while orbiting the celestial body; and wherein:
the plurality of satellites are positioned based on a Walker code T/P/F, where T is the total number of satellites in a full Walker rosette corresponding to the Walker code, P is the number of distinct orbits, and F/T is the phase shift between adjacent orbits in fractions of an orbit revolution; and
the Walker code T/P/F is determined by the equation $$F = (T - c + nP)N/(c-1)$$

where c is the number of cycles in the wave, N is the number of satellites in each orbit, N is the greatest common factor of T and (c−1), and n is an integer chosen such that the integer F satisfies $0 \leq F < P$.

13. The constellation of claim 12 wherein c=4.

14. The constellation of claim 13 wherein T is divisible by 3; N=3; and n=−2.

15. The constellation of claim 14 wherein the Walker code T/P/F is 27/9/5.

16. The constellation of claim 12 wherein c=3.

17. The constellation of claim 12 wherein c=5.

18. The constellation of claim 12 further comprising a ground station adapted for enabling communication with at least one of the plurality of satellites.

19. The constellation of claim 12 wherein:
the plurality of satellites includes T satellites; and
the satellites are positioned in the full Walker rosette.

20. The constellation of claim 19 wherein the plurality of satellites achieves complete satellite coverage of a surface of the celestial body.

21. The constellation of claim 1 wherein:
the celestial body is Earth; and
the plurality of orbits are low-earth orbits.

22. The constellation of claim 21 wherein the common altitude is less than 1600 km.

23. The constellation of claim 21 wherein the plurality of orbits are substantially below the earth's trapped radiation belts.

24. The constellation of claim 1 wherein the common inclination is approximately 60 degrees.

25. The constellation of claim 1 wherein a first satellite from the plurality of satellites is adapted to maintain a permanent communications link with a second satellite positioned adjacent to said first satellite in the predetermined order on the certain wave.

26. The constellation of claim 25 further comprising a ground station adapted for enabling communication with at least one of the plurality of satellites.

27. The constellation of claim 1 wherein a first satellite from the plurality of satellites is adapted to maintain a temporary communications link with a second satellite positioned not adjacent to said first satellite in the predetermined order.

28. A method for deploying a constellation about a celestial body, the constellation comprising a plurality of man-made satellites, the method comprising:
orbiting a plurality of satellites along a plurality of orbits about the celestial body, the plurality of orbits located at a common altitude and having a common inclination, the common inclination measured with respect to a reference circle about the celestial body, each satellite orbiting the celestial body along one of the plurality of orbits;
each orbit having at least one certain satellite in the orbit which corresponds to at least one certain satellite in each of the other orbits;
phasing the plurality of orbits so that said certain satellites are positioned in a predetermined order substantially along at least one certain wave;
each of said certain satellites maintaining its position in the predetermined order along the certain wave while orbiting the celestial body; and
said certain wave rotating about the celestial body at a given fraction of the speed of rotation of the satellites in their orbits.

29. The method of claim 28 further comprising maintaining a communications link between a ground station and the plurality of satellites.

30. The method of claim 28 wherein the plurality of satellites includes at least seven satellites.

31. The method of claim 28 wherein:
the orbits are circular; and
each of the satellites orbits the celestial body at substantially the same constant rotational velocity.

32. The method of claim 28 further comprising, for each orbit, spacing the satellites orbiting along said orbit evenly about said orbit.

33. The method of claim 28 further comprising evenly spacing a plurality of ascending nodal crossing points of the reference circle about the reference circle, each nodal crossing point characterizing one of the plurality of orbits.

34. A method for deploying a constellation about a celestial body, the constellation comprising a plurality of man-made satellites, the method comprising:
positioning a plurality of man-made satellites in a predetermined order substantially along a wave;
orbiting the plurality of satellites along a plurality of orbits about the celestial body, the plurality of orbits located at a common altitude and having a common inclination, the common inclination measured with respect to a reference circle about the celestial body, each satellite orbiting the celestial body along one of the plurality of orbits while maintaining its position in the predetermined order along the wave; and wherein the step of positioning the plurality of satellites comprises:
selecting a Walker code T/P/F which satisfies the equation $$F = (T - c + nP)N/(c-1)$$

where T is the total number of satellites in a full Walker rosette corresponding to the Walker code, P is the number of distinct orbits, F/T is the phase shift between adjacent orbits in fractions of an orbit revolution, c is the number of cycles in the wave, N is the number of satellites in each orbit, N is the greatest common factor of T and (c−1), and n is an integer chosen such that the integer F satisfies $0 \leq F < P$; and positioning the plurality of satellites based on the Walker code.

35. The method of claim 34 wherein:

the step of selecting the Walker code T/P/F includes selecting T equal to the number of satellites in the plurality of satellites; and the step of positioning the plurality of satellites includes positioning the satellites in a full Walker rosette corresponding to the selected Walker code.

36. The method of claim 35 wherein the step of positioning the plurality of satellites achieves complete satellite coverage of a surface of the celestial body.

37. The method of claim 28 further comprising maintaining a permanent communications link between a first and a second satellite from the plurality of satellites, the first satellite positioned adjacent to the second satellite in the predetermined order along the certain wave.

38. The method of claim 28 further comprising maintaining a permanent communications network among the plurality of satellites, the communications network adapted for enabling communications between any two satellites from the plurality of satellites.

39. The method of claim 38 wherein the step of maintaining the permanent communications network includes, for each satellite, maintaining a permanent communications link between said satellite and a second satellite positioned adjacent to said satellite in the predetermined order.

40. The method of claim 38 further comprising maintaining a communications link between a ground station and the permanent communications network.

41. The method of claim 28 further comprising maintaining a temporary communications link between a first and a second satellite from the plurality of satellites, the first satellite positioned not adjacent to the second satellite in the predetermined order.

42. The method of claim 28 further comprising maintaining a permanent communications link between satellites traveling through a first portion of the certain wave and satellites traveling through a second portion of the certain wave.

43. The method of claim 42 wherein the step of maintaining the permanent communications link comprises:

establishing a first temporary communications link between a first and a second satellite from the plurality of satellites, the first satellite traveling through the first portion of the certain wave and the second satellite traveling through the second portion of the certain wave;

establishing a second temporary communications link between a third and a fourth satellite from the plurality of satellites, the third satellite traveling through the first portion of the certain wave and positioned adjacent to the first satellite in the predetermined order, the fourth satellite traveling through the second portion of the certain wave and positioned adjacent to the second satellite in the predetermined order; and breaking the first temporary communications link after establishing the second temporary communications link.

44. The method of claim 28 wherein the step of positioning the plurality of satellites along the certain wave comprises:

positioning a first group of satellites along a first certain wave, the first group including a plurality of satellites from the plurality of satellites;

positioning a second group of satellites along a second certain wave, the second group including a plurality of satellites from the plurality of satellites; and making the first certain and second certain waves coherent.

45. The method of claim 28 wherein the step of positioning the plurality of satellites along the certain wave comprises:

positioning a first group of satellites along a first orbit;

positioning a second group of satellites along a second orbit;

simultaneously positioning the first and second groups along a plurality of certain waves; and rephasing the first and second groups of satellites within their orbits to make the plurality of certain waves coherent.

46. The method of claim 45 further comprising maintaining a communications network among the first and second groups, the communications network adapted for enabling communications between any two satellites from the first and second groups.

47. The method of claim 46 wherein the step of maintaining the permanent communications network includes:

for each certain wave, maintaining communications between the satellites positioned along said certain wave; and maintaining communications between satellites positioned on different certain waves.

48. The method of claim 46 further comprising maintaining a communications link between a ground station and the communications network.

49. The constellation of claim 1 wherein all of the satellites in all of the orbits are positioned on a single certain wave.

50. The constellation of claim 1 wherein each orbit has a plurality of satellites and wherein there are a plurality of certain waves.

* * * * *